O. GASSETT,
Assignor, by mesne assignments, to R. PITCAIRN and G. H. CHRISTY, trustees.
HYDRAULIC AND ELECTRIC INTERLOCKING APPARATUS.
No. 10,435. Reissued Jan. 8, 1884.
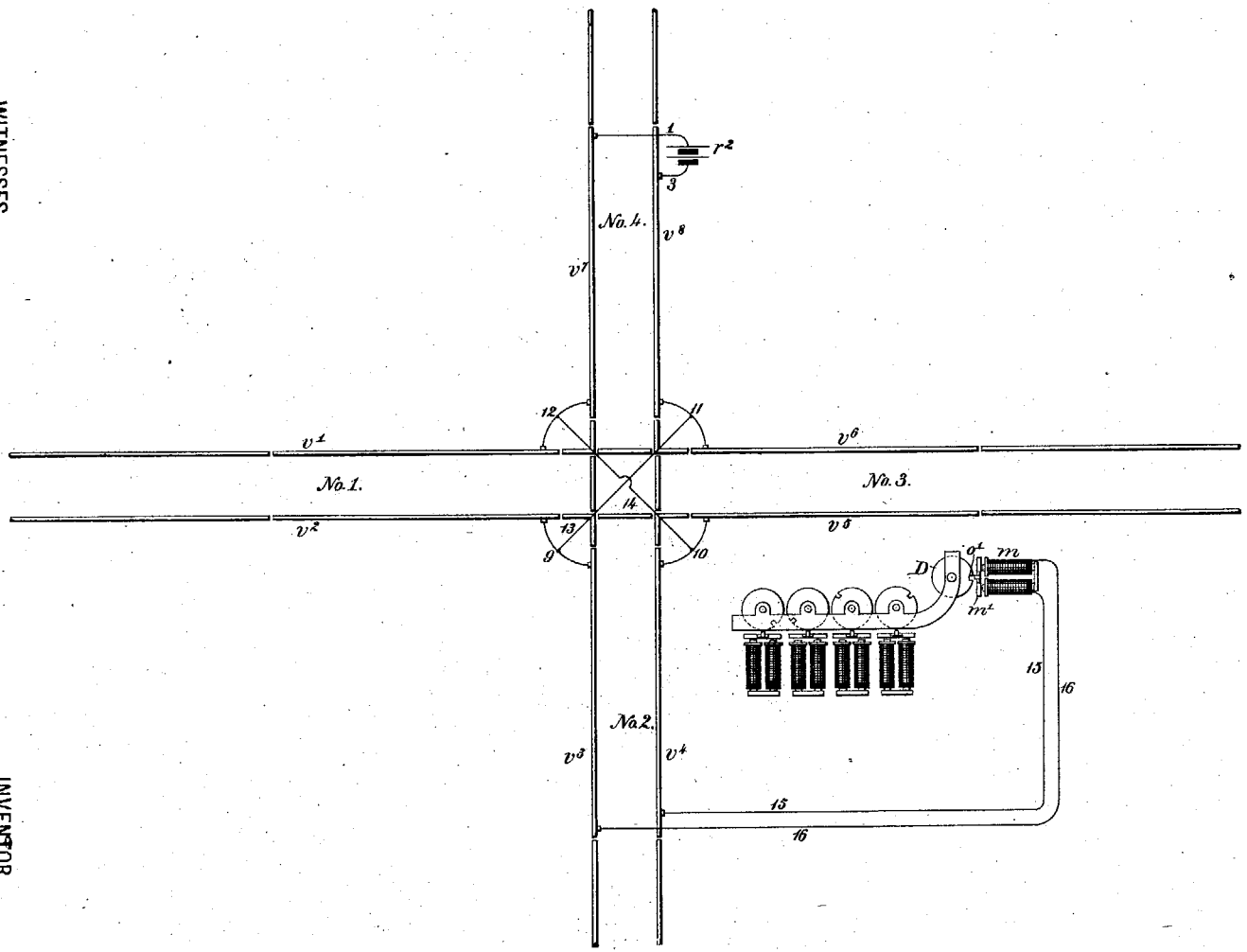
WITNESSES
Wm A. Skinkle
Carrie E. Ashley
INVENTOR
Oscar Gassett
By his Attorneys
Pope Edgecomb & Butler
THE NORRIS PETERS CO., WASHINGTON, D. C.

UNITED STATES PATENT OFFICE.

OSCAR GASSETT, OF BOSTON, MASSACHUSETTS, ASSIGNOR, BY MESNE ASSIGNMENTS, TO ROBERT PITCAIRN AND GEORGE H. CHRISTY, TRUSTEES, OF PITTSBURG, PENNSYLVANIA.

HYDRAULIC AND ELECTRIC INTERLOCKING APPARATUS.

SPECIFICATION forming part of Reissued Letters Patent No. 10,435, dated January 3, 1884.

Original No. 236,957, dated October 31, 1882. Application for reissue filed December 13, 1883.

DIVISION B.

*To all whom it may concern:*

Be it known that I, OSCAR GASSETT, a citizen of the United States, and a resident of Boston, in the county of Suffolk and State of Massachusetts, have invented or discovered certain new and useful Improvements in Electric Circuits for Hydraulic and Electric Interlocking Apparatus; and I do hereby declare the following to be a full, clear, concise, and exact description thereof, reference being had to the accompanying drawing, making part of this specification, which is a diagram showing the crossing-point of two intersecting lines of railway upon the same level, together with a section of each track in each direction from said crossing-point.

My invention is designed to be employed in connection with a system of hydraulic, electric, or other signaling apparatus for protecting trains from collision with each other at such crossings or intersections.

The object of the invention is to enable a locomotive, car, or train approaching such crossing from either direction, and upon either one of said intersecting lines of railway, to automatically actuate electrical circuit breaking or controlling apparatus, whereby danger-signals are exhibited at signaling-points situated at a proper distance from the crossing in both directions upon the intersecting line, whereby the crossing-point may be guarded against the approach of trains upon said intersecting line of railway, which might, if allowed to proceed, bring about a collision between the two trains at the point of crossing.

The operation of my improved system depends, therefore, upon the action of circuit-breakers or circuit-closers controlled by the position of locomotives, cars, and trains. I prefer to employ for this purpose circuit-closers or circuit-controllers formed of insulated sections of track, of greater or less length, the construction and organization of which insulated track-sections are fully set forth in Letters Patent No. 129,425, of F. L. Pope, dated July 16, 1872, and reissued October 21, 1873, as No. 5,622, and also in Letters Patent of W. Robinson, No. 130,661, of August 20, 1872, reissued July 7, 1874, as No. 5,958. These insulated sections of track each consist of two parallel lines of rails of equal length, insulated from each other by the non-conducting ties upon which they rest, each constituting a continuous electric conductor from one end of the section to the other, and such section is also separated from the adjacent section in each direction by means of insulated joints or splices, whereby each line of rails is rendered mechanically continuous, and at the same time electrically discontinuous. In the drawing such an insulated section is shown as having been introduced into each of the four tracks radiating from the crossing, and in the immediate vicinity thereof, as shown at $v^1$ $v^2$ $v^3$ $v^4$ $v^5$ $v^6$ and $v^7$ $v^8$. These four insulated sections should extend at least far enough from the crossing-point to insure a train which has passed beyond them upon one line being clear of a passing train upon the intersecting line. One rail of each track forming one of the insulated sections just described is electrically united with the others by means of conductors 9 13 11, and the remaining rails of each section are in like manner united by another set of conductors, 10 14 12. A battery or other suitable electric generator, $r^2$, has its opposite poles connected by wires or other conductors, 1 and 3, to the opposite rails of some one of the insulated sections—as, for instance, $v^7$ $v^8$. In like manner the terminals of an electro-magnet, $m$, are connected by conductors 15 and 16 with the opposite lines of rails of one of the sections, as $v^3$ $v^4$. Thus it will be understood that one pole of the battery $r^2$ and one terminal of the electro-magnet $m$ is in connection with one of each pair of insulated rails of the four track-sections, designated in the drawing as numbers 1 to 4, respectively, and the other pole of the battery with the other terminal of the electro-magnet is in like manner in connection with the remaining rail of the pair constituting each of the four sections; hence in the normal condition of affairs a constant current from the battery $r^2$ will traverse the coils of the electro-magnet $m$, maintaining it constantly in a magnetic condition; but if a conducting-connection of comparatively small resistance is established between the opposite insulated rails of either one of the four sections described, as by the presence thereupon of a locomotive, car, or train, the current of the battery will be diverted or shunted from the coils of the electro-magnet *m*, and the latter will become demagnetized.

In the apparatus shown in the drawing the electro-magnet *m* is so arranged that its armature-lever *m'*, when attracted by the magnet, shall stand clear of a disk, D, fixed upon a shaft, by the rotation of which shaft the signals which normally stand in a position to indicate "danger" may be changed to indicate "safety;" hence when the circuit of the electro-magnet *m* is shunted by an incoming train on either one of the tracks, or by a train standing on the crossing, the armature-lever will be released, and will fall back into a notch, *o'*, formed in the periphery of the disk D, thereby locking the same so that it cannot be turned. In this manner all conflicting signals may be automatically locked so long as a train or any part thereof remains on or near the crossing, and no collision can occur if the indications of the signals are obeyed.

The application of the hereinbefore-described system of electric circuits to a complete hydraulic and electric interlocking apparatus for actuating signals is fully set forth and claimed in another division of this reissue application, designated as Division A, and therefore need not be described in detail.

I hereby disclaim, so far as this specification and Letters Patent are concerned, all inventions shown, described, and claimed, or to be claimed, in the reissue application designated as Division A, of even date herewith. This disclaimer is intended to embrace and does embrace every invention not specifically claimed in the claim at the end of this specification, and all inventions shown, described, or otherwise set forth herein, and which are also found in said Division A, but not claimed herein, are left in said division.

I claim as my invention—

The combination, substantially as hereinbefore set forth, of four independently-insulated sections of railway-track extending radially in different directions from a crossing or intersection, a battery having one of its poles connected with one insulated line of rails of each of said sections and its remaining pole with the other insulated line of rails of each section, and an electro-magnet having its opposite terminals connected with the respective lines of rails of each section in the same manner as the poles of the battery, whereby a continuous electric current from said battery will traverse said electro-magnet, except when diverted therefrom by the establishment of a direct electric connection between the opposite insulated lines of rails of one or more of said insulated sections.

OSCAR GASSETT.

In presence of—
DANIEL W. EDGECOMB,
CHARLES A. TERRY.